United States Patent [19]

Yabuta et al.

[11] Patent Number: 5,116,930

[45] Date of Patent: May 26, 1992

[54] SELF-CURING RESIN

[75] Inventors: Motoshi Yabuta, Hadano; Yoshiyuki Yukawa; Yasushi Nakao, both of Hiratsuka, all of Japan

[73] Assignee: Kansai Paint Company Limited, Hyogo, Japan

[21] Appl. No.: 663,530

[22] Filed: Mar. 4, 1991

[30] Foreign Application Priority Data

Mar. 6, 1990 [JP] Japan .................... 2-56185

[51] Int. Cl.⁵ ............................................. C08G 18/80
[52] U.S. Cl. ................................. 528/45; 525/328.2; 525/374; 525/383; 525/384; 526/310; 526/312; 528/44
[58] Field of Search ............... 528/45, 44; 525/328.2, 525/374, 383; 526/310

[56] References Cited

U.S. PATENT DOCUMENTS

| | | | |
|---|---|---|---|
| 3,799,854 | 3/1974 | Jerabek | 204/181.7 |
| 3,896,158 | 7/1975 | Rice | 528/44 |
| 3,975,250 | 8/1976 | Marchetti | 204/181.7 |
| 4,153,775 | 5/1979 | Winkelmann | 528/45 |
| 4,191,834 | 3/1980 | Tucker | 526/301 |
| 4,463,143 | 7/1984 | Holubka | 525/528 |
| 4,659,795 | 4/1987 | Tsutsui | 526/301 |
| 4,794,154 | 12/1988 | Benefiel | 528/45 |

Primary Examiner—Joseph L. Schofer
Assistant Examiner—Fred Zitomer
Attorney, Agent, or Firm—Armstrong & Kubovcik

[57] ABSTRACT

The invention provides a self-curing resin which contains one or more blocked isocyanate groups and one or more hydroxyl groups in the molecule and which is produced by polymerizing a monomer component containing an isocyanate-containing, radical-polymerizable monomer as an essential monomer thereof, blocking part of the isocyanate groups in the resulting polymer and then reacting the remaining unblocked isocyanate group or groups with an alkanolamine for hydroxyl group introduction into the polymer.

6 Claims, No Drawings

SELF-CURING RESIN

BACKGROUND OF THE INVENTION

This invention relates to a novel self-curing resin which contains, in the molecule, reactive groups complementary to each other, namely a blocked isocyanate group and a hydroxyl group and which is useful as an adhesive or paint, for instance.

Two-component (two-can) or one-component (one-can) type paint systems comprising a hydroxyl-containing polymer, such as an acrylic polyol, and an isocyanate or blocked isocyanate, which is a crosslinking agent or curing agent, can form paint films excellent in chemical resistance, physical properties, weather resistance and so forth and have hithertofore been used widely as automobile paints and so on.

Among them, however, two-component systems have drawbacks. For example, they raise health and safety problems on the occasions of isocyanate crosslinking agent incorporation and paint application, in particular. The paint prepared by admixing the two components has a short pot life (working life); the paint may acquire an excessively increased viscosity during paint application and/or paint applicators may become difficult to wash, for instance. One component systems also have their drawbacks. Since the compatibility between blocked polyisocyanate compound (crosslinking agent) and hydroxyl-containing polymer is low, they give paint films poor in curability, luster and surface smoothness.

Unexamined Japanese Patent Publication No. 186722/1988, among others, discloses, as a measure for removing these drawbacks, a self-curing resin produced by copolymerizing an unblocked or blocked isocyanate-containing, radical-polymerizable monomer and a hydroxyl-containing, radical-polymerizable monomer and, hence, containing complementary reactive groups in the molecule.

However, by this measure, it is difficult to prevent the reaction between the isocyanate group and the hydroxy group even when the copolymerization reaction between the unblocked isocyanate-containing, radical-polymerizable monomer and the hydroxyl-containing, radical-polymerizable monomer is conducted at a temperature as low as possible. Gelation tends to occur readily during the polymerization reaction. Thus, it is difficult to conduct the polymerization to a sufficient extent while inhibiting gelation. On the other hand, when a blocked isocyanate-containing monomer is used, the tendency toward gelation during polymerization indeed decreases as compared with the above. However, phenol- or oxime-blocked isocyanate-containing monomers, for instance, require a high temperature of 120°-140° C. or above for polymerization and, therefore, the blocking agents may undergo dissociation during polymerization, disadvantageously leading to gelation and at the same time to marked polymer discoloration. Furthermore, polymers derived from blocked isocyanate-containing monomers in which other blocking agents are used require a crosslinking/curing temperature of 150°-170° C. or above, which is higher than that for ordinary heat-curable resins, since the dissociation temperature for said blocking agents is high. Hence, a self-curing resin, which is curable at low temperatures (not higher than 120° C.), can scarcely be obtained.

It is an object of the invention to provide a novel self-curing resin free of the drawbacks mentioned above.

Another object of the invention is to provide a novel self-curing resin which can be readily produced by polymerization without gelation or discoloration and can be cured at low temperatures.

These and other objects of the invention will become apparent from the description which follows.

SUMMARY OF THE INVENTION

The invention provides a self-curing resin which contains one or more blocked isocyanate groups and one or more hydroxyl groups in the molecule and which is produced by polymerizing a monomer component comprising an isocyanate group-containing, radical-polymerizable monomer as an essential monomer, partly blocking the isocyanate groups of the resulting polymer and then introducing hydroxyl groups into the polymer by reacting the isocyanate groups thereof which remain unblocked as yet with an alkanolamine.

The present inventors made intensive investigations in an attempt to overcome the above-mentioned drawbacks of the prior art self-curing resins and found the following facts:

(1) that a novel self-curing resin can be obtained by polymerizing an isocyanate group-containing, radical polymerizable monomer, partly blocking the isocyanate groups of the resulting polymer and then introducing hydroxyl groups into the polymer by reacting the remaining isocyanate groups thereof with an alkanolamine;

(2) that, in that case, said resin can be produced without gelation, discoloration or the like; and (3) that such resin can be obtained which is curable at low temperatures.

The present invention summarized hereinabove has been completed based on such novel findings.

In the practice of the invention, a monomer component mainly comprising an isocyanate group-containing, radical-polymerizable monomer (hereinafter referred to as "NCO monomer" for short) containing, in each molecule thereof, at least one free, unblocked isocyanate group and at least one radical-polymerizable double bond is first used to produce a polymer containing at least two free, unblocked isocyanate groups in the molecule (hereinafter such polymer shall be referred to as "NCO polymer" for short).

Usable as the NCO monomer are, for instance, one or more members selected from among methacryloyl isocyanate, 2-isocyanatoethyl methacrylate, m- or p-isopropenyl-$\alpha,\alpha'$-dimethylbenzyl isocyanate, the equimolar adduct of a hydroxy-containing vinyl monomer and a diisocyanate compound, etc.

Referring to the above-mentioned adduct, the hydroxyl-containing vinyl monomer is a compound containing, in each molecule thereof, one hydroxyl group and one radical-polymerizable double bond and includes, among others, glycol ($C_2$ to $C_{20}$) monoesters of acrylic or methacrylic acid, such as 2-hydroxyethyl (meth)acrylate, 2-hydroxypropyl (meth)acrylate, etc. The diisocyanate compound contains two isocyanate groups per molecule and includes tolylene diisocyanate, 4,4'-diphenylmethanediisocyanate, xylylene diisocyanate, hexamethylene diisocyanate, lysine diisocyanate, 4,4'-methylenebis(cyclohexyl diisocyanate), methylcyclohexane-2,4(2,6)-diisocyanate, isophorone diisocyanate and trimethylhexanediisocyanate, among others.

Particularly preferred among the NCO monomers mentioned above are 2-isocyanatoethyl methacrylate, m-isopropenyl-α,α'-dimethylbenzyl isocyanate, the equimolar adduct of 2-hydroxyethyl acrylate and isophoronediisocyanate, and the like.

The NCO polymer can be prepared by polymerizing the above-mentioned NCO monomer alone or copolymerizing the same with some other radical-polymerizable monomer or monomers.

Preferred as the other radical-polymerizable monomers are compounds containing a radical-polymerizable double bond per molecule but having no active hydrogen (e.g. —OH, >NH, —NH$_2$). As typical examples of such compounds, there may be mentioned aromatic vinyl monomers, such as styrene, α-methylstyrene, vinyltoluene, etc.; (meth)acrylate esters, such as methyl (meth)acrylate, ethyl (meth)acrylate, butyl (meth)acrylate, 2-ethylhexyl (meth)acrylate, lauryl (meth)acrylate, tridecyl (meth)acrylate, stearyl (meth)acrylate, cyclohexyl (meth)acrylate, benzyl (meth)acrylate, etc.; fluorine-containing vinyl monomers, such as VISCOCE 3F, VISCOCE 3MF, VISCOCE 8F, VISCOCE 8MF (trademarks; products of OSAKA ORGANIC CHEMICAL INDUSTRY LTD.), fluorine-containing vinyl monomers, such as perfluorocyclohexyl (meth)acrylate, N-2-propylperfluorooctanesulfonamidoethyl (meth)acrylate, vinyl fluoride, vinylidene fluoride, etc.; nitrogen-containing vinyl monomers, such as N,N'-dimethylaminoethyl (meth)acrylate, N,N'-diethylaminoethyl (meth)acrylate, N,N'-dimethylamino-propyl(meth)acrylamide, etc.; vinyl ether monomers, such as vinyl ethyl ether, vinyl butyl ether, etc.; and glycidyl (meth)acrylate, 3,4-epoxycyclohexylmethyl (meth)acrylate, allyl glycidyl ether, alkyl-etherified methylolacrylamides, (meth)acrylamide, (meth)acryloyl chloride, vinyl chloride, vinylidene chloride, (meth)acrylonitrile, γ-methacryloxyalkyltrimethoxysilanes, etc. These may be used either singly or in the form of a mixture of two or more of them.

In the monomer component in which the NCO monomer is a main monomer, the proportions between the NCO monomer and the other radical-polymerizable monomer or monomers is not critical if the proportions are within a range such that the NCO polymer produced contains two or more free isocyanate groups per molecule. Generally, however, the NCO monomer/other radical-polymerizable monomer(s) weight ratio should preferably be within the range of about 100/0 to about 1/99, more preferably about 100/0 to about 10/90.

Generally, the polymerization reaction of the NCO monomer alone or with some other radical-polymerizable monomer or monomers is preferably carried out in an inert organic solvent having no active hydrogen.

The term "inert organic solvent having no active hydrogen" means an solvent free of any active hydrogen reactive with an isocyanate group. Useful as such solvent are, for example, aliphatic hydrocarbons, aromatics, esters, ketones, and mixed solvents composed of two or more of these. These solvents may contain moisture in some instances and, therefore, they should preferably be dehydrated in advance as necessary or where appropriate.

The NCO polymer is produced by polymerizing the NCO monomer alone, or together with some other radical-polymerizable monomer or monomers, in an inert organic solvent and generally at a temperature of about 50°–180° C. using a radical polymerization initiator. The molecular weight of said polymer can be adjusted by adjusting the reaction concentration, initiator quantity and so on. The reaction concentration, when expressed in terms of polymer content, is generally within the range of about 20 to about 80% by weight.

Usable as the radical initiator are, for example, organic peroxides, such as benzoyl peroxide, lauroyl peroxide, caproyl peroxide, tert-butyl peroctoate, diacetyl peroxide, etc.; azo catalysts, such as azobisisobutyronitrile, azobis-α, γ-dimethylvaleronitrile, dimethyl a,a'-azoisobuyyrate, etc.; dialkyl peroxydicarbonates, such as diisopropyl peroxycarbonate etc.; and redox initiators. The initiator concentration is preferably within the range of about 0.01 to 15% by weight, more preferably about 0.1 to 10% by weight, on the total monomer basis.

Alternatively, the polymerization may be carried out using electron beams or ultraviolet rays, for instance, without using any polymerization initiator.

In addition, the ionic polymerization and group transfer polymerization techniques may also be used.

When, in this polymerization reaction, p-isopropenyl-α,α'-dimethylbenzyl isocyanate is used as the NCO monomer, it is preferable to carry out the polymerization at 100° C. or above using a peroxide or carbonate initiator so that a sufficient extent of polymerization can be attained. More preferably, the combined use of an acrylate monomer(s) may readily result in the production of a sufficiently polymerized NCO polymer.

The NCO polymer produced in the above manner for use in the practice of the invention has a number average molecular weight within the range of about 500 to 50,000, preferably about 1,000 to 40,000, more preferably about 3,000 to 30,000.

The NCO polymer contains two or more free isocyanate groups per molecule but should preferably be free of any active hydrogen.

In accordance with the invention, the free isocyanate groups of the NCO polymer produced in the above manner are partly blocked by reacting said polymer with a blocking agent. Thus, the NCO polymer after reaction with the blocking agent contains at least one free, unblocked isocyanate group and at least one blocked isocyanate group.

As the blocking agent, there may be mentioned, among others, phenols, such as phenol, cresol, xylenol, p-ethylphenol, o-isopropylphenol, p-tert-butylphenol, p-tert-octylphenol, thymol, p-naphthol, p-nitrophenol, p-chlorophenol, etc.; alcohols, such as methanol, ethanol, propanol, butanol, ethylene glycol, ethylene glycol monomethyl ether, ethylene glycol monobutyl ether, diethylene glycol monomethyl ether, benzyl alcohol, ethylene glycol monophenyl ether, furfuryl alcohol, cyclohexanol, etc.; active methylene compounds, such as dimethyl malonate, diethyl malonate, ethyl acetoacetate, etc.; mercaptans, such as butylmercaptan, thiophenol, tert-dodecylmercaptan; acid amides, such as acetonanilide, acetoanisidide, acetamide, benzamide, etc.; imides, such as succinimide, maleimide, etc.; amines, such as diphenylamine, phenylnaphthylamine, aniline, carbazole, etc.; imidazoles, such as imidazole, 2-ethylimidazole, etc.; ureas, such as urea, thiourea, ethyleneurea, etc.; carbamates, such as phenyl N-phenylcarbamate, 2-oxazolidone, etc.; imines, such as ethylenimine etc.; oximes, such as formaldoxime, acetoaldoxime, methyl ethyl ketoxime, cyclohexanone oxime, etc.; sulfites, such as sodium bisulfite, potassium bisulfite, etc.; lactams, such as ε-caprolactam, δ-valerolactam, γ-butyrolactam, β-propiolactam, etc.

Among these, phenols, lactams, alcohols and oximes are particularly preferred. When a blocking agent dissociable at low temperatures is used, the final product self-curing resin can become curable at low temperatures.

The reaction between the NCO polymer and blocking agent is carried out generally at a temperature of about 20°–150° C. following incorporation of the blocking agent into an organic solution of the NCO polymer. If necessary or where appropriate, a tin catalyst may be used.

The amount of the blocking agent to be charged is determined by calculating in advance the number of moles of the isocyanate group to be blocked based on the amount of the hydroxyl group to be introduced into the NCO polymer. To be concrete, the amount of the blocking agent is preferably determined such that about 5–95%, more preferably about 20–80%, of all free isocyanate groups contained in the NCO polymer be blocked.

Hydroxyl group introduction into the NCO polymer is then performed by reacting the remaining unblocked isocyanate groups contained in the NCO polymer with the amino group of an alkanolamine.

The alkanolamine may be a primary or secondary one and includes, among others, mono- and dialkanolamines, such as 2-(methylamino)ethanol, 2-(n-butylamino)ethanol, 2-(dodecylamino)ethanol, mono- or diethanolamine, diisopropanolamine, 4-piperidineethanol, etc. Among them, 2-(methylamino)ethanol, diethanolamine and the like are particularly preferred.

The reaction between the isocyanate group and the alkanolamine proceeds very rapidly. Generally, the reaction, when carried out approximately at room temperature, will be complete in a short period of time. In this step, both the functional groups (blocked isocyanate and hydroxy) are introduced into the NCO polymer. When the reaction is conducted at an unnecessarily high temperature, the blocking agent may partly dissociate and allow the reaction between both the functional groups to occur, leading to viscosity increase or gelation. Therefore, the reaction should preferably be carried out at 70° C. or below.

As a rule, the alkanolamine should preferably be charged in an amount sufficient to react with all unblocked isocyanate groups remaining in the NCO polymer after blocking. When a dialkanolamine is used as the alkanolamine, the hydroxyl group introduction can be achieved more efficiently as compared with monoalkanolamines (two hydroxyl groups versus one hydroxyl group on the per-mole basis).

The self-curing resin according to the invention, when evaluated as a self-crosslinking coat film, will afford the highest degree of crosslinking when the content of the blocked isocyanate group and that of the hydroxy group in each molecule thereof are equivalent to each other (equimolar). For its use in paint or adhesive compositions, however, either one of the functional groups should preferably be in excess when the substrate-to-coat layer adhesion is taken into consideration. The hydroxyl value (mg KOH/g) should suitably be within the range of about 25–250, preferably about 30–150 and the isocyanate value (g/1000 g) within the range of about 15–250, preferably about 20–150.

Since neither active hydrogen-containing polymerizable monomer nor active hydrogen-containing solvent is used in the polymerization system for the NCO monomer, the NCO polymer according to the invention will not gelate in said system at all. Furthermore, since, in accordance with the invention, the NCO polymer is reacted with a blocking agent, heating of the blocking agent to a temperature necessary for its reaction with the isocyanate group will suffice for blocking the isocyanate group. For example, said blocking can be attained at about 100° C. or below using a phenol or oxime or the like blocking agent, which readily causes discoloration at high temperatures, without heating to higher temperatures and without any discoloration. Such blocking agent can dissociate or be eliminated at low temperatures (about 100° C. or below), hence is advantageously suited for use in producing low-temperature curing resins. Even when a blocking agent showing a high dissociation temperature is used, the reaction of said blocking agent with the NCO polymer can proceed smoothly without inducing gelation.

The self-curing resin of the invention as obtained in the above manner and containing both the blocked isocyanate group and hydroxyl group is suitably used generally in the form of a resin composition containing an organic solvent as a medium. The inert organic solvent used as the reaction solvent in the polymerization, blocking and hydroxyl group introduction reactions mentioned above can conveniently be used without substitution. If necessary or where appropriate, however, various organic solvents, inclusive of active hydrogen-containing organic solvents, may be used for addition and/or substitution.

The solid resin content in the resin composition mentioned above is recommendably within the range of about 40–70% by weight.

The self-curing resin of this invention and compositions comprising the same have excellent self-curability and storage stability and are suitably used as paints, adhesives and so on.

For use as paints, for instance, they take the form of one-component paints with various pigments, fillers, surface modifiers, degradation inhibitors, etc. added as necessary or where appropriate.

When heated, the resin according to the invention can be crosslinked and cured by itself. If necessary or where appropriate, however, other polyols, reactive diluents and crosslinking agents (e.g. melamine plast, blocked isocyanate, epoxy, acid, and alkoxysilane crosslinking agents) may be incorporated into the compositions. Various curing catalysts may be used as well.

As the curing catalysts, there may be mentioned, for instance, monoamines, such as triethylamine, N,N-dimethylcyclohexylamine, etc.; diamines, such as triethylenediamine, N,N,N',N'-tetramethylethylenediamine, N,N,N',N'-tetramethylpropane-1,3-diamine, N,N,N',N'-tetramethylhexane-1,6-diamine, etc.; triamines, such as N,N,N',N'',N''-pentamethyldiethylenetriamine, N,N,N',N'',N''-pentamethyldipropylenetriamine, tetramethylguanidine, etc.; cyclic amines, such as N,N'-dimethylpiperazine, N-methyl-N'-(2-dimethylaminoethyl)piperazine, 1,2-dimethylimidazole, etc.; and organometals, such as stannous octoate, dibutyltin diacetate, dibutyltin dilaurate, dibutyltin mercaptides, dibutyltin maleate, lead naphthenate, etc.

Paints, adhesives and other compositions which contain the resin of this invention can be cured at a temperature of 50°–200° C., preferably 80°–150° C., to give three-dimensionally crosslinked films, layers, etc.

The following examples are further illustrative of the invention but are by no means limitative of the scope thereof.

In the examples and comparative examples. "part(s)" and "%" are by weight unless otherwise specified.

EXAMPLE 1

A reaction vessel equipped with a stirrer, reflux condenser and thermometer was charged with 65 parts of xylene and the xylene was heated to and maintained at 110° C. Thereto was added dropwise a mixture of 40 parts of 2-isocyanatoethyl methacrylate, 15 parts of styrene, 30 parts of n-butyl methacrylate, 15 parts of 2-ethylhexyl methacrylate and 2.5 parts of azobisisobutyronitrile over 3 hours.

Then, a mixture of 35 parts of xylene and 0.5 part of azobisisobutyronitrile was added dropwise over 1 hour. After further 1 hour of maturation, the reaction mixture was cooled to 30° C. to give an NCO polymer solution. The polymer had a number average molecular weight of about 9,000. (Hereinafter, said solution is referred to as "NCO polymer solution [A]".)

Further, 11.2 parts of methyl ethyl ketone oxime (blocking agent) was added dropwise to the NCO polymer solution [A] over 15 minutes with stirring, followed by 1 hour of maturation. Then, 9.7 parts of 2-(methylamino) ethanol was added dropwise over 15 minutes, followed by 30 minutes of maturation for completion of the reaction.

The thus-obtained one-component type self-curing resin solution (solids content 54%), one embodiment of this invention, occurred as a slightly yellow, transparent liquid with a Gardner viscosity of M and showed no sign of viscosity increase after one-month storage at 30° C.

Said resin had a hydroxyl value of 72.3 mg KOH/g of resin and an isocyanate value of 54.2 g/1000 g of resin.

Dibutyltin dilaurate was added to the above resin solution to a concentration of 0.2% on the solids content basis. The resultant composition still showed good storage stability.

EXAMPLE 2

Methyl ethyl ketone oxime (14.9 parts) was added to the NCO polymer solution [A] under the same conditions as in Example 1 for blocking two thirds (⅔) of the free isocyanate groups. Then, 6.5 parts of 2-(methylamino)ethanol was added to the reaction mixture and the reaction was driven to completion under the same conditions as in Example 1 for hydroxyl group introduction into the NCO polymer at all the remaining free isocyanate group sites.

The resin solution (solids content 54%) obtained occurred as a slightly yellowish, transparent liquid with a Gardner viscosity of K and showed no sign of viscosity increase even after one-month storage at 30° C.

The resin obtained had a hydroxyl value of 48.2 and an isocyanate value of 72.2 (the units being the same as in Example 1).

EXAMPLE 3

A reaction vessel equipped with a stirrer, reflux condenser and thermometer was charged with 65 parts of xylene, the xylene was heated to and maintained at 130° C., and a mixture of 50 parts of m-isopropenyl-α, α'-dimethylbenzyl isocyanate, 30 parts of n-butyl methacrylate, 20 parts of 2-ethylhexyl methacrylate and 3.5 parts of tert-butyl peroxyisopropylcarbonate was added dropwise thereto over 3 hours.

Then, a mixture of 35 parts of xylene and 1.0 part of tert-butyl peroxyisopropylcarbonate was added dropwise over 1 hour and, after further 1 hour of maturation, the reaction mixture was cooled to 30° C. to give an NCO polymer solution (the number average molecular weight of the polymer being about 6,500). (Hereinafter this solution is referred to as "NCO polymer solution [B]".)

Further, 10.8 parts of methyl ethyl ketone oxime was added dropwise to the above solution with stirring over 15 minutes, followed by 2 hours of maturation. Then, 9.3 parts of 2-(methylamino)ethanol was added dropwise to the reaction mixture over 15 minutes, followed by 30 minutes of maturation for driving the reaction to completion.

The thus-obtained resin solution (solids content 54%) of this invention occurred as a slightly yellowish, transparent liquid with a Gardner viscosity of P and showed no sign of viscosity increase even after one-month storage at 30° C.

Said resin had a hydroxyl value of 69.7 mg KOH/g of resin and an isocyanate value of 52.2 g/1000 g of resin.

Even after addition of dibutyltin dilaurate at an addition level of 0.2% on the solids content basis, the above resin solution showed good storage stability.

EXAMPLE 4

Methyl ethyl ketone oxime (14.4 parts) was added to the NCO polymer solution [B] under the same conditions as in Example 3 for blocking two thirds (⅔) of the free isocyanate groups. Then, 8.7 parts of diethanolamine to the reaction mixture and the reaction was driven to completion under the same conditions as in Example 3 for hydroxyl group introduction at all the remaining free isocyanate group sites.

The thus-obtained resin solution (solids content 54%) according to the invention occurred as a slightly yellowish, transparent liquid with a Gardner viscosity of O. Even after one-month storage at 30° C., no viscosity increase was observed.

The resin obtained had a hydroxyl value of 93.0 and an isocyanate value of 69.6 (the units being the same as above).

EXAMPLE 5

A reaction vessel equipped with a stirrer, reflux condenser and thermometer was charged with 65 parts of xylene, the xylene was heated to and maintained at 110° C., and a mixture of 45 parts of the equimolar adduct of isophorone diisocyanate and 2-hydroxyethyl acrylate, 15 parts of styrene, 25 parts of n-butyl methacrylate, 15 parts of 2-ethylhexyl methacrylate and 2.5 parts of azobisisobutyronitrile was added dropwise over 3 hours.

Then, a mixture of 35 parts of xylene and 0.5 part of azobisisobutyronitrile was added dropwise over 1 hour and, after 1 hour of maturation, the reaction mixture was cooled to 30° C. to give an NCO polymer solution (the number average molecular weight of the polymer being about 9,000). (Hereinafter, this solution is referred to as "NCO polymer solution [C]".)

Methyl ethyl ketone oxime (8.2 parts) was added dropwise to the above solution with stirring over 15 minutes, followed by 1 hour of maturation. Then, 7.1 parts of 2-(methylamino)ethaol was added dropwise over 15 minutes, followed by 30 minutes of maturation for driving the reaction to completion.

The resin solution (solids content 54%) obtained occurred as a slightly yellowish, transparent liquid with a Gardner viscosity of P. Even after one-month storage at 30° C., no viscosity increase was observed.

The resin obtained had a hydroxyl value of 53.0 mg KOH/g of resin and an isocyanate value of 39.6 g/1000 g of resin.

fraction determination, each cured film was extracted with acetone at the refluxing temperature for 7 hours.

The results obtained are shown in Table 1.

TABLE 1

| Item | Example 1 | | Example 2 | | Example 3 | | Example 4 | | Example 5 | |
| --- | --- | --- | --- | --- | --- | --- | --- | --- | --- | --- |
| Curing catalyst | Not used | Used | Not used | Used | Not used | Used | Not used | Used | Not used | Used |
| Storage stability | Good | Good | Good | Good | Good | Good | Good | Good | Good | Good |
| Gel fraction | 70 | 83 | 65 | 80 | 60 | 90 | 60 | 91 | 68 | 79 |
| | 93 | 95 | 92 | 94 | 95 | 98 | 96 | 98 | 92 | 94 |

Even after addition of dibutyltin dilaurate at an addition level of 0.2% on the solids content basis, the above resin solution had good storage stability.

COMPARATIVE EXAMPLE 1

A reaction vessel equipped with a stirrer, reflux condenser and thermometer was charged with 65 parts of xylene, the xylene was heated to and maintained at 110° C., and a mixture of 20 parts of 2-isocyanatoethyl methacrylate, 15 parts of styrene, 20 parts of 2-ethylhexyl methacrylate, 30 parts of n-butyl methacrylate, 15 parts of 2-hydroxyethyl acrylate and 2.5 parts of azobisisobutyronitrile was added dropwise over 3 hours in an attempt to effect polymerization. However, gelation occurred 30 minutes after starting the dropping.

COMPARATIVE EXAMPLE 2

In the procedure of Example 1, 2-(methylamino)ethanol was added to the NCO polymer solution [A] before the addition of methyl ethyl ketone oxime. Gelation occurred after 1 hour.

COMPARATIVE EXAMPLE 3

A reaction vessel equipped with a stirrer, reflux condenser and thermometer was charged with 65 parts of xylene, the xylene was heated to and maintained at 130° C., and a mixture of 30 parts of methyl ethyl ketone oxime-blocked m-isopropenyl-α,α'-dimethylbenzyl isocyanate (equimolar reaction product), 20 parts of n-butyl methacrylate, 30 parts of 2-hydroxyethyl methacrylate, 20 parts of 2-ethylhexyl methacrylate and 3.5 parts of tert-butyl peroxyisopropylcarbonate was added dropwise over 3 hours.

The liquid obtained had a very high viscosity (Gardner viscosity Z3) and was is a gel state. It had a dark brown color (color number 15 as measured on a Hellige colorimeter).

Such viscosity and color made it difficult to use the liquid as a paint or paint base.

PERFORMANCE TEST RESULTS

The resin solutions of Example 1 to 5 and the corresponding compositions prepared by adding thereto dibutyltin dilaurate at an addition level of 0.2% on the solids content basis were tested for storage stability. Said solutions and compositions were each applied to a tin plate to a dry film thickness of about 60 μm, followed by 30 minutes of baking at 120° C. or 140° C. Each cured film was tested for gel fraction. For gel Notes to the items in Table 1:
Curing catalyst:
Not used: Dibutyltin dilaurate was not added.
Used: Dibutyltin dilaurate was not added.
Storage stability:
When the viscosity increase after one-month storage at 30° C. was not more than 2 levels on the Gardner viscosity scale, the storage stability was regarded as good.
Gel fraction:
Weight percentage of the nonextractible matter after 7-hour extraction of the transparent cured film (60 μm) with acetone under reflux.
The values in the upper row are for the films baked at 120° C. and values in the lower row are for the films baked at 140° C.

What is claimed is:

1. A self-curing resin containing at least one blocked isocyanate group and at least one hydroxyl group in the resin molecule, the resin being produced by polymerizing a monomer component containing, as an essential monomer thereof, at least one isocyanate group-containing, radical-polymerizable monomer, whereby a polymer is formed, blocking part of the isocyanate groups of the polymer and then introducing one or more hydroxyl groups into the polymer by reacting the isocyanate group or groups thereof which remain unblocked as yet with an alkanolamine whereby the resin is formed.

2. A self-curing resin as claimed in claim 1, wherein the isocyanate group-containing, radical-polymerizable monomer is at least one member selected from the class consisting of methacryloyl isocyanate, 2-isocyanatoethyl methacrylate, m- or p-isopropenyl-α, α'-dimethylbenzyl isocyanate, and the equimolar adduct of a hydroxyl group-containing vinyl monomer and a diisocyanate.

3. A self-curing resin as claimed in claim 1, wherein the polymer obtained by polymerizing the monomer component has a number average molecular weight of about 500 to about 50,000.

4. A self-curing resin as claimed in claim 1, wherein about 5 to 95% of all free isocyanate groups contained in the polymer obtained by polymerizing the monomer component are blocked.

5. A self-curing resin as claimed in claim 1 which has a hydroxyl value of about 25 to 250 mg KOH/g and an isocyanate value of about 15 to 250 g/1000 g.

6. A resin composition which comprises the self-curing resin of claim 1 and an organic solvent.

* * * * *